United States Patent
Yang

(10) Patent No.: US 6,866,321 B2
(45) Date of Patent: Mar. 15, 2005

(54) INSTRUMENT PANEL

(75) Inventor: Ho-Jun Yang, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/330,190

(22) Filed: Dec. 30, 2002

(65) Prior Publication Data

US 2004/0108745 A1 Jun. 10, 2004

(30) Foreign Application Priority Data

Dec. 4, 2002 (KR) ................. 10-2002-0076630

(51) Int. Cl.$^7$ ............................................. B62D 25/14
(52) U.S. Cl. ..................... 296/72; 296/70; 296/193.02; 180/90
(58) Field of Search ............................. 296/70, 72, 74, 296/96.21, 190.1, 193.02, 93, 201; 180/90; 280/752

(56) References Cited

U.S. PATENT DOCUMENTS

| | | | | |
|---|---|---|---|---|
| 3,602,327 A | * | 8/1971 | Barenyi et al. | ............... 180/90 |
| 4,223,754 A | * | 9/1980 | Mizuno et al. | ............... 180/90 |
| 4,400,011 A | * | 8/1983 | Matsuno | ...................... 180/90 |
| 4,597,461 A | * | 7/1986 | Kochy et al. | ................. 180/90 |
| 5,816,613 A | * | 10/1998 | Specht et al. | ............... 280/753 |
| 6,110,037 A | * | 8/2000 | Yoshinaka | ............. 296/190.09 |
| 6,193,305 B1 | * | 2/2001 | Takahashi | .................... 296/192 |
| 6,345,837 B1 | * | 2/2002 | Warnez et al. | ........... 280/728.3 |
| 6,354,655 B1 | * | 3/2002 | Kuhns | .................... 296/190.09 |
| 6,520,566 B2 | * | 2/2003 | Kim | .......................... 296/192 |

FOREIGN PATENT DOCUMENTS

FR        002696382 A1 * 4/1994 ................. 180/90

* cited by examiner

*Primary Examiner*—D. Glenn Dayoan
*Assistant Examiner*—Greg Blankenship
(74) *Attorney, Agent, or Firm*—Greenblum & Bernstein, P.L.C.

(57) ABSTRACT

Disclosed is an instrument panel joined to a front glass of a vehicle. More specifically, the instrument panel includes: a hole formed, in horizontal direction, in an interior of an end portion of the instrument panel; an upper convex portion and a lower convex portion having a constant thickness around the hole; and a foam supporting portion connected with and projected from the upper and the lower convex portions, in which the upper and lower convex portions and the foam supporting portion, are uniform in their thickness, respectively. Therefore, the instrument panel capable of forming an uniform hole upon gas forming process, and preventing transformation in appearance, is provided.

3 Claims, 2 Drawing Sheets

INSTRUMENT PANEL

BACKGROUND OF THE INVENTION

1. Field of the Invention

The present invention relates to an instrument panel of a vehicle and particularly to an instrument panel capable of preventing sink mark formation on appearance of the instrument panel upon forming process, by forming a foam member combined to a front glass, and a hole, in horizontal direction, in an interior of an end portion of the instrument panel combined to the foam member, and by forming an upper convex portion and a lower convex portion having an uniform thickness around the hole.

2. Description of the Related Art

In general, the instrument panel is positioned on a front side in an interior of a vehicle, so that an instrument board, an audio and an air bag are mounted and also plays a role of blocking noise delivered from an engine room.

The end portion of the instrument panel of the related art will be described with reference to the accompanying FIG. 1 in the following.

An upper end of a foam member is combined to a front glass, and a lower end of the foam member is combined to an end portion of an instrument panel, and the end portion has a thickness such that the thickness is tapered in its extension from an upper end portion to a lower end portion.

But, an upper front portion of the end portion in the instrument panel according to the related art having the foregoing construction, is a portion that receives very much a direct ray of light reflected through the glass. Therefore, in summer times, the temperature of the front portion, would rise up to about 120° C. Such upper front portion of the instrument panel is large in its thickness, so that a problem that partial sink mark is formed upon forming process, is generated.

SUMMARY OF THE INVENTION

To solve the above-indicated problems, it is, therefore, an object of the present invention to eliminate sink mark phenomenon partially formed on the front side of the instrument panel by forming a hole, in horizontal direction, in an interior of the end portion of the instrument panel, by forming an upper convex portion and a lower convex portion around the hole, and by forming a foam supporting portion extended from the upper and lower convex portions.

The foregoing and other objects and advantages are realized by providing an instrument panel combined to a front glass of a vehicle including: a hole formed, in horizontal direction, in an interior of an end portion of the instrument panel; an upper convex portion and a lower convex portion having a constant thickness around the hole; and a foam supporting portion connected with and projected from the upper and the lower convex portions, in which the upper and lower convex portions, and the foam supporting portion, are uniform in their thickness, respectively.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
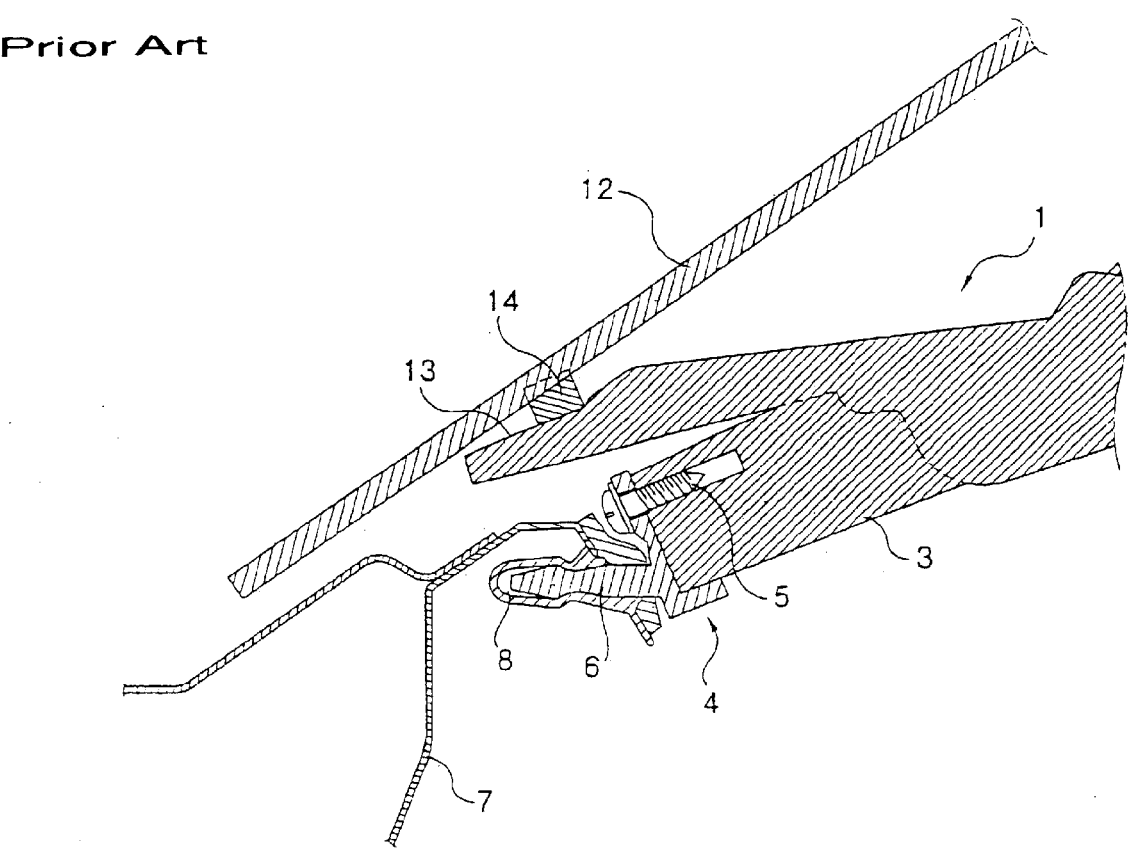
FIG. 1 is a cross-sectional view of joining for an instrument panel of the related art.
Figure 2:
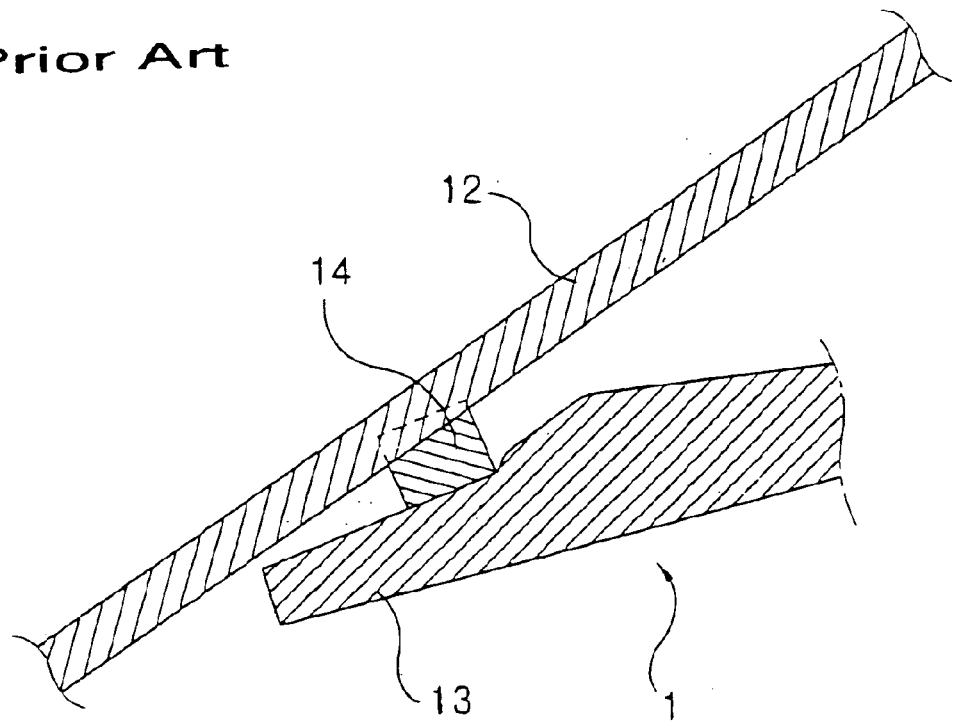
FIG. 2 is an enlarged, cross-sectional view of an end portion of a foam supporting portion of the related art according to FIG. 1.
Figure 3:
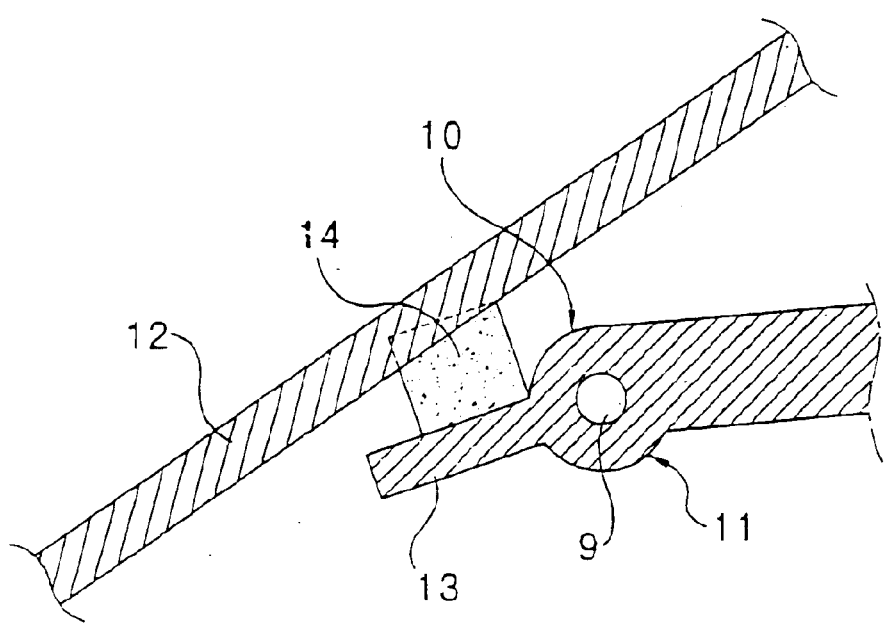
FIG. 3 is an enlarged, cross-sectional view of an end portion according to the present invention.

A preferred embodiment of the present invention will now be described with reference to the accompanying FIG. 3, which is an enlarged, cross-sectional view of the end portion according to the present invention.

In the following description, same drawing reference numerals are used for the same elements even in different drawings.

First of all, a lower inside of the instrument panel 1 is joined to a boss 3 and one end of the boss 3 is joined to a connecting member 4. Here, the one end of the connecting member 4 joined to the boss 3, is fixed by means of a tapping screw 5 and the other end of the connecting member 4 has a clip 6.

The clip 6 is inserted into joining portion 8 formed on an inner panel 7 of a vehicle, and is joined to the inner panel accordingly.

In the meantime, a front end portion of the instrument panel 1 has a hole 9 in its interior, in horizontal direction with respect to a vehicle. Around the hole 9, an upper convex portion 10 and a lower convex portion 11 having a constant thickness, are formed.

Also, a foam supporting portion is formed to the side of a glass 12, extended from the upper and the lower convex portions 10 and 11. Here, the upper and the lower convex portions 10 and 11, and the foam supporting portion 13 are preferably uniform in their thickness.

Also, a foam member 14 is inserted between the upper convex portion 10 and the glass 12.

As is apparent from the foregoing, the hole is formed in the interior of the front end portion of the instrument panel, and the upper and the lower convex portions having a uniform thickness are formed around the hole, whereby transformation of the front portion of the instrument panel could be prevented.

The following effects are expected thanks to the instrument panel according to the present invention.

Firstly, sink mark formation phenomenon of the related art could be eliminated by forming the hole in the interior of the end portion of the instrument panel, and by forming the upper and the lower convex portions.

Secondly, the hole could be easily formed in the interior of the end portion, in the horizontal direction, by forming the upper and the lower convex portions.

Thirdly, thanks to the foam supporting portion connected with and extended from the upper and the lower convex portions, the foam member is not easily moved after being joined.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An instrument panel joined to a front glass of a vehicle, the instrument panel comprising:
   a hole extending, in a horizontal direction, along an interior of an end portion of the instrument panel;
   an upper convex portion and a lower convex portion having a constant thickness around the hole; and
   a supporting portion extended from, and formed unitarily and in one piece with, the upper and lower convex portions, wherein the upper and lower convex portions, and the supporting portion are uniform in thickness, wherein the supporting portion is a foam member supporting portion.

2. An instrument panel joined to a front glass of a vehicle, the instrument panel comprising:
   a hole extending, in a horizontal direction, along an interior of an end portion of the instrument panel;
   an upper convex portion and a lower convex portion having a constant thickness around the hole;
   a supporting portion extended from, and formed unitarily and in one piece with, the upper and lower convex portions, wherein the upper and lower convex portions, and the supporting portion are uniform in thickness; and
   a foam member supported by the supporting portion.

3. An apparatus comprising:
   a front glass of a vehicle;
   a foam member; and
   an instrument panel of a vehicle, the instrument panel comprising:
      a hole extending, in a horizontal direction, along an interior of an end portion of the instrument panel;
      an upper convex portion and a lower convex portion having a constant thickness around the hole; and
      a supporting portion extended from, and formed unitarily and in one piece with, the upper and lower convex portions, wherein the upper and lower convex portions, and the supporting portion are uniform in thickness,
   wherein the foam member is supported by the supporting portion between the front glass and the instrument panel.

* * * * *